(12) United States Patent
Mauney et al.

(10) Patent No.: US 10,216,749 B2
(45) Date of Patent: Feb. 26, 2019

(54) PERFORMING ACTIONS ASSOCIATED WITH POSITIVE FEEDBACK EVENTS

(71) Applicant: Microsoft Technology Licensing, LLC, Redmond, WA (US)

(72) Inventors: Bradley Scott Mauney, Mountain View, CA (US); Vinodh Jayaram, Fremont, CA (US); Peter Rusev, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/143,982

(22) Filed: Dec. 30, 2013

(65) Prior Publication Data
US 2014/0297748 A1 Oct. 2, 2014

Related U.S. Application Data

(60) Provisional application No. 61/806,276, filed on Mar. 28, 2013.

(51) Int. Cl.
*H04L 29/08* (2006.01)
*G06F 17/30* (2006.01)
(Continued)

(52) U.S. Cl.
CPC ....... *G06F 17/30106* (2013.01); *G06Q 50/01* (2013.01); *H04L 65/403* (2013.01); *H04L 67/22* (2013.01); *H04L 67/306* (2013.01)

(58) Field of Classification Search
CPC ..... H04L 67/306; H04L 65/403; H04L 67/22; G06F 17/30106; G06Q 50/01
See application file for complete search history.

(56) References Cited

U.S. PATENT DOCUMENTS 5,720,003 A 2/1998 Chiang
7,433,832 B1 * 10/2008 Bezos .................. G06Q 10/10
705/26.8
(Continued)

OTHER PUBLICATIONS

"U.S. Appl. No. 14/144,051, Response filed Jun. 26, 2016 to Non Final Office Action dated Feb. 26, 2016", 19 pgs.
(Continued)

*Primary Examiner* — Wing F Chan
*Assistant Examiner* — Billy H Ng
(74) *Attorney, Agent, or Firm* — Schwegman Lundberg & Woessner, P.A.

(57) ABSTRACT

Systems and methods for providing behavior feedback to members of a social network service are described. In some example embodiments, the systems and methods access information associated with positive feedback events for a member of a social network service, identify activities associated with the positive feedback events that were performed by the member of the social network service, and perform an action based on the identified one or more activities performed by the member of the social network service. For example, the systems and methods may display and/or update a dashboard that tracks and provides information associated with a member's status and interactions inside and outside of the social network service, may provide recommendations to other members that identify activities determined to generate positive feedback events for the members, and so on.

19 Claims, 6 Drawing Sheets

(51) Int. Cl.
*H04L 29/06* (2006.01)
*G06Q 50/00* (2012.01)

(56) References Cited

U.S. PATENT DOCUMENTS

| | | | |
|---|---|---|---|
| 7,873,621 B1 | 1/2011 | Dater et al. | |
| 8,504,486 B1* | 8/2013 | Pinto | G06Q 30/0631 705/1.1 |
| 8,688,796 B1* | 4/2014 | Lavian et al. | 709/207 |
| 8,856,229 B2 | 10/2014 | Ramamurthy et al. | |
| 8,943,047 B1 | 1/2015 | Carpio et al. | |
| 8,990,393 B2 | 3/2015 | Rizk | |
| 9,032,306 B2 | 5/2015 | Wang et al. | |
| 9,043,397 B1 | 5/2015 | Ravichandran et al. | |
| 9,104,734 B2 | 8/2015 | Blaschak et al. | |
| 9,111,285 B2 | 8/2015 | Amidon | |
| 9,112,731 B2 | 8/2015 | Cohen | |
| 9,201,979 B2 | 12/2015 | Ramer et al. | |
| 9,240,059 B2 | 1/2016 | Zises et al. | |
| 9,323,784 B2 | 4/2016 | King | |
| 9,386,080 B2 | 7/2016 | Nowak | |
| 9,398,854 B2 | 7/2016 | Proud | |
| 9,454,586 B2 | 9/2016 | Ghosh et al. | |
| 9,483,908 B2 | 11/2016 | Shore et al. | |
| 9,516,360 B2 | 12/2016 | Grokop | |
| 9,524,077 B1 | 12/2016 | Pattan | |
| 9,665,584 B2 | 5/2017 | Jayaram et al. | |
| 2002/0161647 A1* | 10/2002 | Gailey et al. | 705/14 |
| 2003/0195884 A1* | 10/2003 | Boyd | G06F 17/30867 |
| 2004/0117283 A1* | 6/2004 | Germack | 705/35 |
| 2006/0129446 A1* | 6/2006 | Ruhl et al. | 705/10 |
| 2007/0192130 A1* | 8/2007 | Sandhu | 705/1 |
| 2009/0063247 A1* | 3/2009 | Burgess | G06Q 30/02 705/7.34 |
| 2010/0017237 A1* | 1/2010 | Dalesandro | G06F 3/04855 705/5 |
| 2010/0049590 A1* | 2/2010 | Anshul | 705/10 |
| 2010/0049852 A1 | 2/2010 | Whitnah | |
| 2011/0082825 A1* | 4/2011 | Sathish et al. | 706/46 |
| 2011/0137776 A1* | 6/2011 | Goad et al. | 705/34 |
| 2011/0191417 A1 | 8/2011 | Rathod | |
| 2011/0302102 A1* | 12/2011 | Yeleshwarapu et al. | 705/347 |
| 2012/0278127 A1* | 11/2012 | Kirakosyan et al. | 705/7.29 |
| 2013/0055109 A1 | 2/2013 | Takamura et al. | |
| 2013/0097101 A1* | 4/2013 | Ortiz | 706/11 |
| 2013/0218822 A1* | 8/2013 | Remaker | 706/45 |
| 2013/0268457 A1* | 10/2013 | Wang et al. | 705/347 |
| 2014/0019233 A1 | 1/2014 | Goder et al. | |
| 2014/0019533 A1 | 1/2014 | Sherman et al. | |
| 2014/0089816 A1 | 3/2014 | Dipersia et al. | |
| 2014/0122410 A1 | 5/2014 | Ludlow et al. | |
| 2014/0297631 A1 | 10/2014 | Jayaram et al. | |
| 2014/0297749 A1 | 10/2014 | Jayaram et al. | |
| 2014/0298204 A1 | 10/2014 | Jayaram et al. | |
| 2015/0178811 A1 | 6/2015 | Chen | |
| 2015/0199715 A1 | 7/2015 | Caron | |
| 2015/0242518 A1 | 8/2015 | Rosenbaum et al. | |
| 2015/0242751 A1 | 8/2015 | Zhang | |
| 2015/0324865 A1 | 11/2015 | Illowsky et al. | |
| 2016/0007083 A1 | 1/2016 | Gurha | |
| 2016/0117329 A1 | 4/2016 | Busey et al. | |
| 2016/0140671 A1 | 5/2016 | Hong | |
| 2016/0217489 A1 | 7/2016 | Allard et al. | |
| 2016/0255170 A1 | 9/2016 | Gargi et al. | |
| 2016/0373891 A1 | 12/2016 | Ramer et al. | |

OTHER PUBLICATIONS

"U.S. Appl. No. 14/144,145, Non Final Office Action dated May 5, 2016", 13 pgs.
"U.S. Appl. No. 14/144,226, Examiner Interview Summary dated May 12, 2016", 3 pgs.
"U.S. Appl. No. 14/144,051, Examiner Interview Summary dated Apr. 21, 2016", 4 pgs.
"U.S. Appl. No. 14/144,051, Non Final Office Action dated Feb. 26, 2016", 16 pgs.
"U.S. Appl. No. 14/144,226, Examiner Interview Summary dated Feb. 24, 2016", 3 pgs.
"U.S. Appl. No. 14/144,226, Final Office Action dated Apr. 29, 2016", 14 pgs.
"U.S. Appl. No. 14/144,226, Non Final Office Action dated Nov. 23, 2015", 13 pgs.
"U.S. Appl. No. 14/144,226, Response filed Feb. 23, 2016 to Non Final Office Action dated Nov. 23, 2015", 9 pgs.
U.S. Appl. No. 14/144,051, filed Dec. 30, 2013, System and Method for Recommending Actions on a Social Network.
U.S. Appl. No. 14/144,145, filed Dec. 30, 2013, System and Method for Displaying Social Network Analytics.
U.S. Appl. No. 14/144,226, filed Dec. 30, 2013, System and Method for Iteratively Updating Characteristics in a Social Network.
"U.S. Appl. No. 14/144,051, Notice of Allowance dated Feb. 2, 2017", 8 pgs.
"U.S. Appl. No. 14/144,051, Notice of Allowance dated Oct. 13, 2016", 10 pgs.
"U.S. Appl. No. 14/144,145, Final Office Action dated Oct. 19, 2016", 13 pgs.
"U.S. Appl. No. 14/144 145, Response filed Feb. 21, 2017 to Final Office Action dated Oct. 19, 2016", 11 pgs.
"U.S. Appl. No. 14/144,145, Response filed Oct. 5, 2016 to Non Final Office Action dated May 5, 2016", 9 pgs.
"U.S. Appl. No. 14/144,226, Examiner Interview Summary dated Dec. 14, 2016", 3 pgs.
"U.S. Appl. No. 14/144,226, Non Final Office Action dated Oct. 25, 2016", 15 pgs.
"U.S. Appl. No. 14/144.226, Response filed Mar. 27, 2017 to Non Final Office Action dated Oct. 25, 2016", 10 pgs.
"U.S. Appl. No. 14/144,228, Response filed Aug. 29, 2016 to Final Office Action dated Apr. 29, 2016", 11 pgs.
"U.S. Appl. No. 14/144,145, Final Office Action dated Nov. 16, 2017", 20 pgs.
"U.S. Appl. No. 14/144,145, Non Final Office Action dated Apr. 21, 2017", 16 pgs.
"U.S. Appl. No. 14/144,145, Response filed Sep. 20, 2017 to Non Final Office Action dated Apr. 21, 2017", 17 pgs.
"U.S. Appl. No. 14/144,226, Examiner Interview Summary dated Aug. 1, 2017", 3 pgs.
"U.S. Appl. No. 14/144,226, Final Office Action dated Jun. 22, 2017", 15 pgs.

* cited by examiner

PERFORMING ACTIONS ASSOCIATED WITH POSITIVE FEEDBACK EVENTS

PRIORITY

This application claims priority to U.S. Provisional Patent Application Ser. No. 61/806,276, filed Mar. 28, 2013, the contents of which are incorporated herein by reference in their entirety.

TECHNICAL FIELD

The present disclosure generally relates to providing recommendations and performing actions using social network service information. More specifically, the present disclosure relates to methods, systems and computer program products for performing actions based on positive feedback events for members of a social network service.

BACKGROUND

Online social network services provide users with a mechanism for defining, and memorializing in a digital format, their relationships with other people. This digital representation of real-world relationships is frequently referred to as a social graph. Many social network services utilize a social graph to facilitate electronic communications and the sharing of information between its users or members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

With many social network services, members are prompted to provide a variety of personal information, which may be displayed in a member's personal web page. Such information is commonly referred to as "personal profile information", or simply "profile information", and when shown collectively, it is commonly referred to as a member's profile. For example, with some of the many social network services in use today, the personal information that is commonly requested and displayed as part of a member's profile includes a member's age (e.g., birth date), gender, contact information, home town, address, the name of the member's spouse and/or family members, a photograph of the member, interests, and so forth. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. As such, many social network services serve as a sort of directory of people to be searched and browsed.

DESCRIPTION OF THE DRAWINGS

Some embodiments of the technology are illustrated by way of example and not limitation in the figures of the accompanying drawings.

DETAILED DESCRIPTION

Overview

The present disclosure describes methods, systems, and computer program products, which individually provide functionality for performing actions based on positive feedback events for members of a social network service.

In some example embodiments, the systems and methods access information associated with positive feedback events for a member of a social network service, identify activities associated with the positive feedback events that were performed by the member of the social network service, and perform an action based on the identified one or more activities performed by the member of the social network service. For example, the systems and methods may display and/or update a dashboard that tracks and provide information associated with a member's status and interactions inside and outside of the social network service, may provide recommendations to other members that identify activities determined to generate positive feedback events for the members, and so on.

In some example embodiments, the systems and methods may access information that identifies positive feedback events (e.g., "likes" or profile views) associated with a member of a social network service, and present a dashboard that displays an aggregation of the accessed information along with information identifying activities performed by the member of the social network service that are associated with the positive feedback events, among other things.

Therefore, in some example embodiments, the systems and methods may leverage the vast knowledge contained within a social network service in order to provide information and/or otherwise perform actions that indicate to members how well they are received by others and recommend activities or other behaviors that may increase or enhance the status or reception of the members, among other things. Such actions may enable a social network service to provide its members with real-time, actionable data about the quality of their profiles, content, and other interactions, as well as provide other members with recommendation on how to increase and/or enhance their profiles, content, and interactions, among other benefits.

In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Other advantages and aspects of the inventive subject matter will be readily apparent from the description of the figures that follows.

Suitable System

Figure 1:
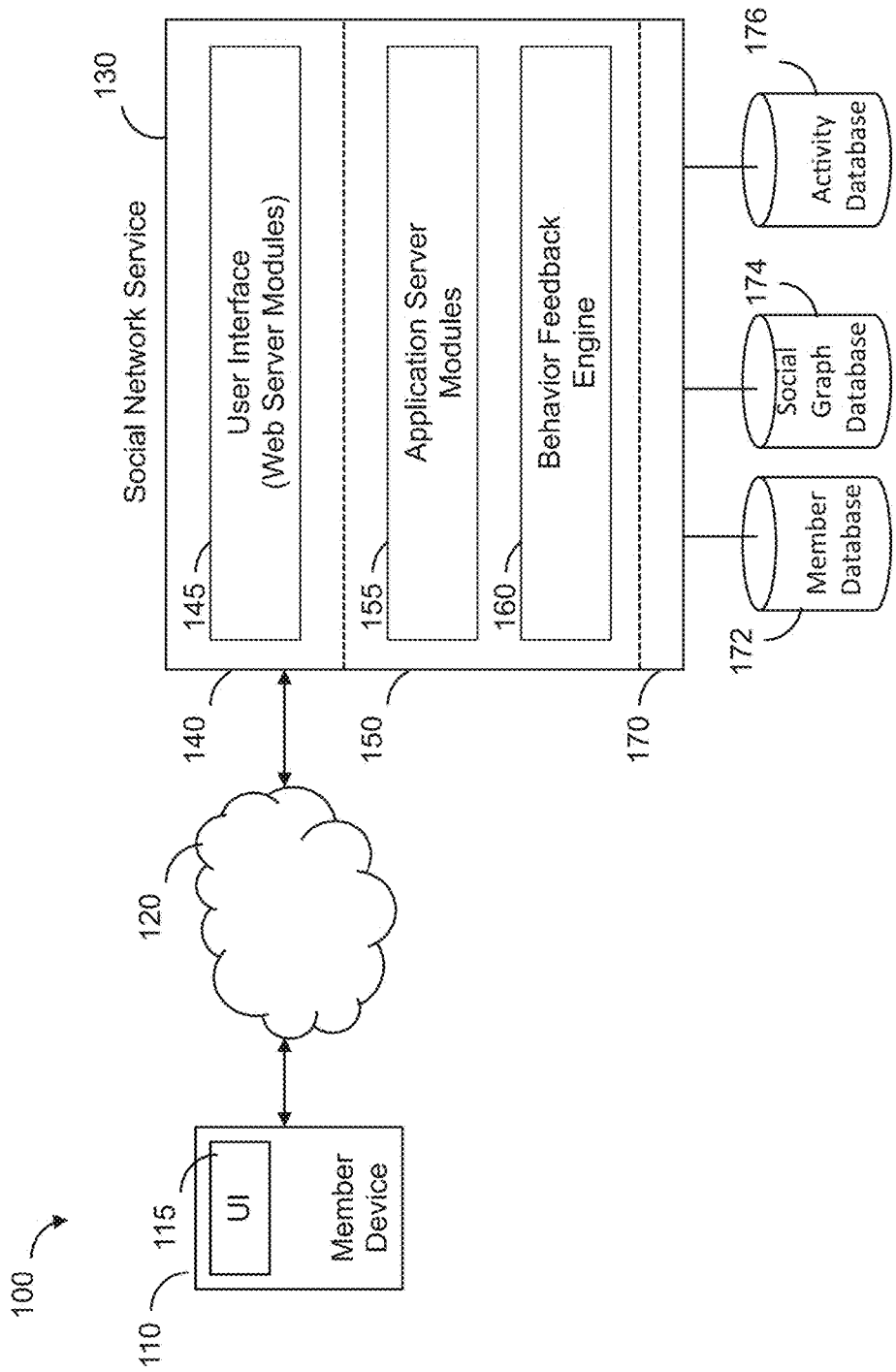
FIG. 1 is a block diagram illustrating various functional components of a suitable computing environment, consistent with some embodiments, for performing actions based on positive feedback events for members of a social network service.

FIG. 1 is a block diagram illustrating various functional components of a suitable computing environment 100, consistent with some embodiments, for performing actions based on positive feedback events for members of a social network service.

As shown in FIG. 1, the computing environment 100 includes a social network service 130 that is generally based on a three-tiered architecture, consisting of a front-end layer 140, an application logic layer 150, and a data layer 170. The modules, systems, and/or engines shown in FIG. 1 represent a set of executable software instructions and the corresponding hardware (e.g., memory and processor) for executing the instructions. However, one skilled in the art will readily recognize that various additional functional modules and engines may be used with the social network service 130 to facilitate additional functionality that is not specifically described herein. Furthermore, the various functional modules and engines depicted in FIG. 1 may reside on a single server computer, or may be distributed across several server computers in various arrangements.

As shown in FIG. 1, the front end layer 140 includes a user interface module (e.g., a web server) 145, which receives requests from various client-computing devices, such as member device 110, over a network 120, and communicates appropriate responses to the requesting client devices. For example, the user interface module(s) 140 may receive requests in the form of Hypertext Transport Protocol (HTTP) requests, or other web-based, application programming interface (API) requests. The client devices 110 may be executing conventional web browser applications, or applications that have been developed for a specific platform to include any of a wide variety of mobile devices and operating systems.

The network 120 may be any communications network utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, wireless data networks (e.g., Wi-Fi® and WiMax® networks), and so on.

As shown in FIG. 1, the data layer 170 includes several databases, including databases for storing data for various entities of the social graph, such as a member database 172 of member profile information (e.g., information identifying attributes, skills, and other information for members), a social graph database 174, which may include a particular type of database that uses graph structures with nodes, edges, and properties to represent and store data, such as social graph information, and an activity database 176, which may include information associated with activities, action, and/or behavior performed by members within the social network service 130 and/or feedback event information associated with endorsements and other interactions between members, such as interactions between members and activities performed by members. Of course, in some example embodiments, any number of other entities might be included in the social graph, and as such, various other databases may be used to store data corresponding with other entities.

In some example embodiments, when a person initially registers to become a member of a social network supported by the social network service 130, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, proficiencies, qualifications, professional organizations, and so on. This information is stored, for example, as member profile information or data in database 172.

Once registered, a member may invite other members, or be invited by other members, to connect via the social network service 130. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph.

The social network service 130 may provide a broad range of other applications and services that allow members the opportunity to share and receive information, often customized to the interests of the member. For example, in some example embodiments, the social network service 130 may include a photo sharing application that allows members to upload and share photos with other members. As such, a photograph may be a property or entity included within a social graph.

In some example embodiments, members of a social network service 130 may be able to self-organize into groups, or interest groups, organized around a subject matter or topic of interest. When a member joins a group, his or her membership in the group may be reflected in the social graph information stored in the social graph database 174. In some example embodiments, members may subscribe to or join groups affiliated with one or more companies. Thus, membership in a group, a subscription or following relationship with a company or group, as well as an employment relationship with a company, may all be examples of the different types of relationships that may exist between different entities, as defined by the social graph and modelled with the social graph information of the social graph database 174.

The application logic layer 150 includes various application server modules 155, which, in conjunction with the user interface module(s) 145, generates various user interfaces (e.g., web pages) with data retrieved from various data sources in the data layer 170. In some example some embodiments, individual application server modules 155 are used to implement the functionality associated with various applications, services and features of the social network service 130. For example, a messaging application, such as an email application, an instant messaging application, or some hybrid or variation of the two, may be implemented with one or more application server modules 155. Similarly, a search engine enabling users to search for and browse member profiles may be implemented with one or more application server modules 155.

In addition to the various application server modules 155, the application logic layer 150 also includes a behavior feedback engine 160 that presents feedback to members of the social network service 130 based on knowledge of positive feedback events associated with activities performed by the members, among other things. Of course, other applications or services that utilize the behavior feedback engine 160 may be separately embodied in their own application server modules 155. The behavior feedback engine 160 may perform one or more algorithmic processes that perform actions (e.g., present a feedback dashboard or provide recommendations) in response to identifying activities associated with positive feedback events.

As illustrated in FIG. 1, in some example embodiments, the behavior feedback engine 160 is implemented as a service that operates in conjunction with various application server modules 155. For instance, any number of individual application server modules 155 may invoke the functionality of the behavior feedback engine 160, to include an application server module associated with receiving information from the member device 110 and/or an application server module associated with an application to facilitate the viewing of user interfaces presenting resource recommendations. However, in some example embodiments, the behavior feedback engine 160 may be implemented as its own application server module such that it operates as a stand-alone application or system.

In some example embodiments, the behavior feedback engine 160 may include or have an associated publicly available Application Programming Interface (API) that enables third-party applications or other applications, algorithms or scripts within the social network service 130 to invoke the functionality of the behavior feedback engine 160, among other things.

Thus, in some example embodiments, the behavior feedback engine 160, either provided by or in collaboration with the social network service 130, provides feedback about the activities or other behaviors of a member, such as statistics and other information identifying positive feedback events associated with the member's activities, and/or recommends activities or other behaviors to the member based on identifying certain activities within or outside of the social network service 130 that lead to or are otherwise associated with positive feedback events, among other things.

Examples for Providing Behavior Feedback to Members of a Social Network

Figure 2:
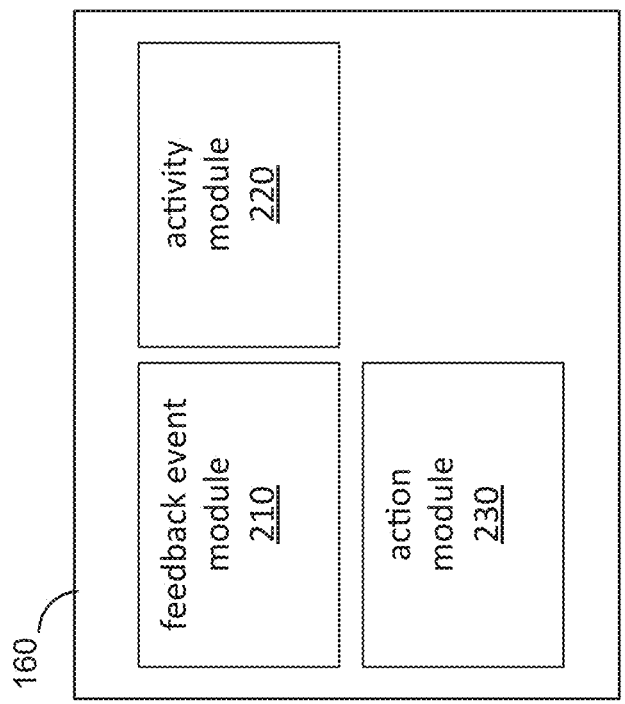
FIG. 2 is a block diagram illustrating example modules of a behavior recommendation engine, consistent with some embodiments.

As described herein, in some example embodiments, the behavior feedback engine 160 provides feedback for activities and behaviors performed by members of a social network service 130, among other things. FIG. 2 is a block diagram illustrating modules of the behavior feedback engine 160, consistent with some embodiments.

As illustrated in FIG. 2, the behavior feedback engine 160 includes a variety of functional modules. One skilled in the art will appreciate that the functional modules are implemented with a combination of software (e.g., executable instructions, or computer code) and hardware (e.g., at least a memory and processor). Accordingly, as used herein, in some example embodiments a module is a processor-implemented module and represents a computing device having a processor that is at least temporarily configured and/or programmed by executable instructions stored in memory to perform one or more of the particular functions that are described herein. The behavior feedback engine 160 includes a feedback event module 210, an activity module 220, and an action module 230.

In some example embodiments, the feedback event module 210 is configured and/or programmed to access information associated with one or more positive feedback events for a member of a social network service. For example, the feedback event module 210 may access information associated with a positive feedback event that occurred within the social network service 130.

A positive feedback event, or in some cases a feedback event that is positive or negative, may be any event, such as an interaction and/or action, that occurs between a member of the social network service 130 and other members of the social network service 130, or between the member of the social network service 130 and users at online locations outside of the social network service 130.

Example positive feedback events may include:

A member "liking" or otherwise endorsing a comment, status update, profile update, blog post, and/or other content provided and/or created by another member;

A member viewing another member's profile provided by the social network service 130;

A member showing up in the results of a search for information within the social network service 130;

The profile of the member showing up in the results of a search for information at a location outside of the social network service 130, such as at Google, Bing, another social network; and so on.

Additionally, in some example embodiments, a positive feedback event may occur for a member of the social network service 130 when the member is mentioned in various types of content published at locations located outside of the social network service 130, such as in blog posts, in Twitter feeds, in articles, in issued patents, in published books or papers, and so on.

In some example embodiments, the activity module 220 is configured and/or programmed to identify one or more activities or other behaviors associated with the positive feedback events that were performed by the member of the social network service 130. For example, the activity module 220 may identify activities performed within the social network service 130 and/or at online locations outside of the social network service 130.

An activity or behavior may be a comment, a status update, a profile update, a blog post, and/or other content provided and/or created by a member of the social network service 130. For example, an activity may be an update to a job title or acquire skill to a member profile of the social network service 130, may be a blog post or other content published or shared to the social network service 130, may be a recommendation or referral of another member or entity, may be "tweeted" or other published content outside of the social network service 130, and so on.

In some example embodiments, the action module 230 is configured and/or programmed to perform an action based on the identified one or more activities performed by the member of the social network service. For example, the action module 230 generate, present, display, and/or update a dashboard that tracks and provide information associated with a member's status and interactions inside and outside of the social network service 130, may provide recommendations to other members that identify activities determined to generate positive feedback events for the members, and so on.

The dashboard may be a graphical element displayed by the social network service 130 that presents behavior feedback information to members of the social network service 130, as well as actionable elements configured to cause the member to perform additional activities associated with the positive feedback events, among other things. For example, the dashboard may present information identifying an aggregation of positive feedback events associated with the member, information associated with statistics for the positive feedback events associated with the member, information associated with two or more types of positive feedback events associated with the member, and so on.

Figure 3:
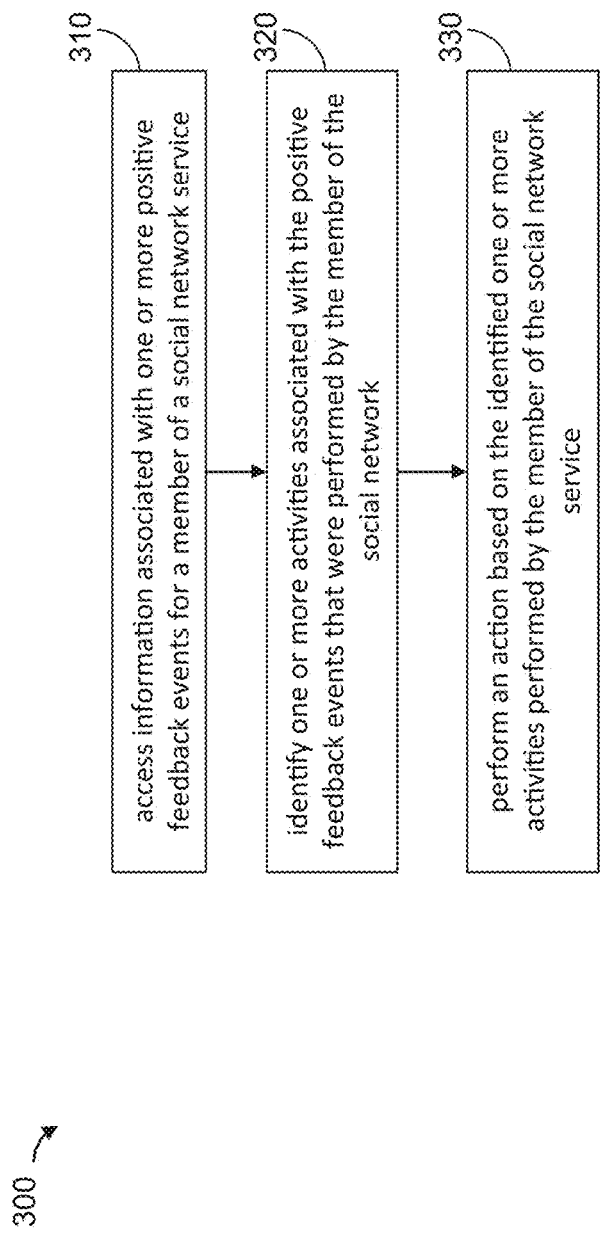
FIG. 3 is a flow diagram illustrating an example method for performing actions based on positive feedback events for members of a social network service, consistent with some embodiments.

As described herein, the behavior feedback engine 160 may perform various methods in order to provide behavior feedback to members of the social network service 130. FIG. 3 is a flow diagram illustrating an example method 300 for performing actions based on positive feedback events for members of a social network service, consistent with some embodiments. The method 300 may be performed by the behavior feedback engine 160 and, accordingly, is described herein merely by way of reference thereto. It will be appreciated that the method 300 may be performed on any suitable hardware.

In operation 410, the behavior feedback engine 160 accesses information associated with one or more positive feedback events for a member of a social network service. For example, as described herein, the feedback event module 210 may access information associated with an endorsement of an activity performed by the member within the social network service 130, information associated with a view of a profile page associated with the member of the social network service 130, and/or other positive feedback events described herein.

In operation 420, the behavior feedback engine 160 identifies one or more activities associated with the positive feedback events that were performed by the member of the social network service. For example, as described herein, the activity module 220 may identify content published by the member within the social network service 130 and/or outside of the social network service 130. Example activities or behaviors that may be identified as being associated with positive feedback events include comments, status updates, profile updates, blog posts, and/or other content provided and/or created by a member of the social network service 130.

Therefore, specific examples of positive feedback events associated with activities performed by members of the social network service 130 include:

A member "liking" a status update provided by another member;

A member viewing another member's profile;

A member commenting on an article shared within the social network service 130 by another member;

A member being "retweeted" by another Twitter user outside of the social network service 130; and so on.

In operation 430, the behavior feedback engine 160 performs an action based on the identified one or more activities performed by the member of the social network service. For example, as described herein, the action module 230 may generate, create, render, display, and/or update a dashboard for the member of the social network service that contains information identifying an aggregation of positive feedback events associated with the member.

Figure 4:
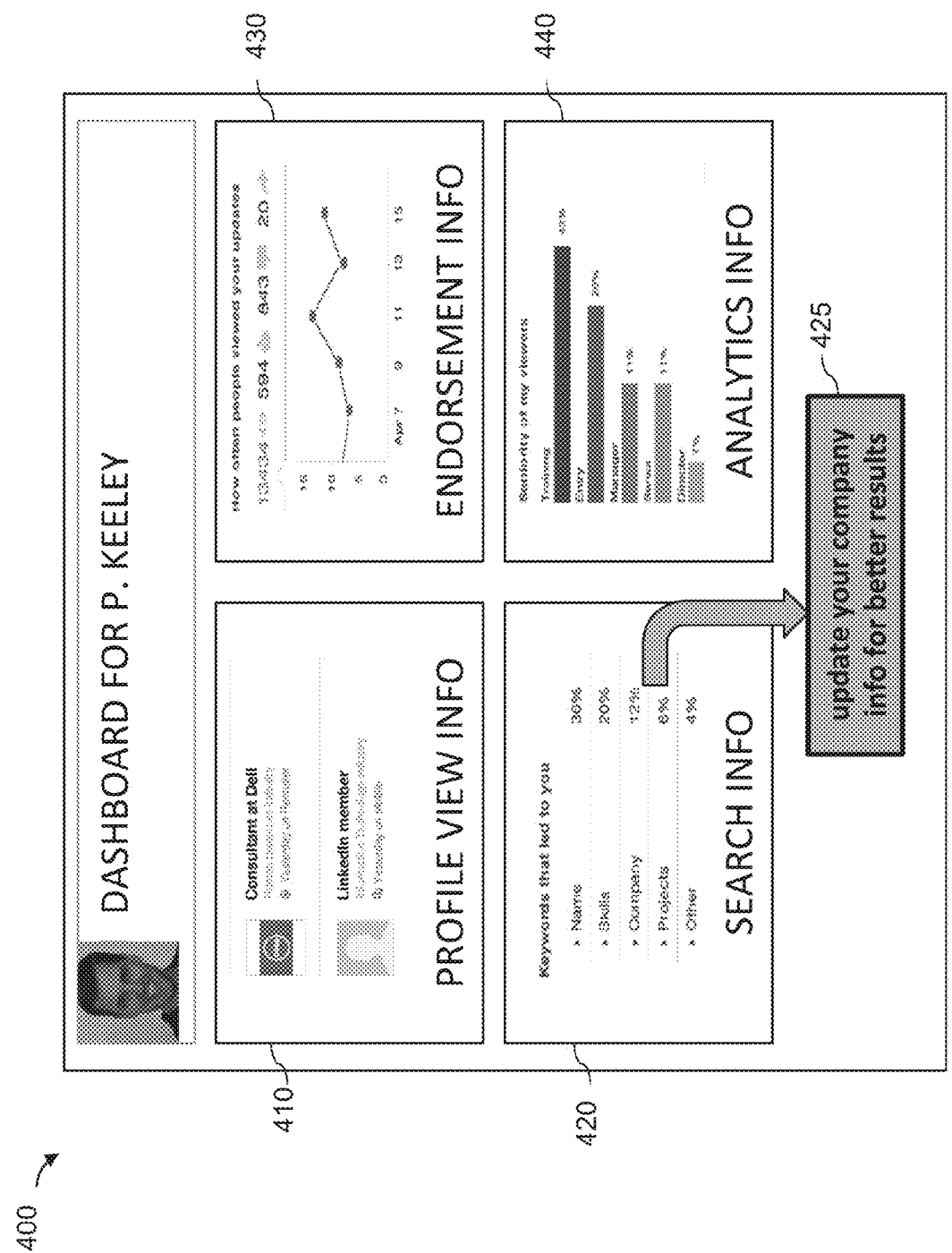
FIG. 4 is a display diagram illustrating a user interface that presents a feedback dashboard to a member of a social network, consistent with some embodiments.

FIG. 4 is a display diagram illustrating a user interface that presents a feedback dashboard 400 to a member of a social network, consistent with some embodiments. The dashboard 400 may include various types of information associated with activities performed or eligible to be performed within the social network service 130, include profile view information 410, search results information 420, aggregated endorsement information 430, analytics information 440, and/or other information not shown in FIG. 4.

Example profile view information 410 may include information identifying other members that viewed a member's profile and/or information identifying various profile view statistics, such as the amount of views in a given time period, a current rate of profile views, biographical information associated with viewers of the member's profile (e.g., locations of viewers, industries for viewers), and so on.

Example search results information 420 may include information identifying a number of appearances in results of searches within the social network service 130, information identifying a number of appearances in results of searches outside of the social network service 130 (e.g., Google search results), information identifying keywords associated with the member's profile appearing in search results, and so on.

Example aggregated endorsement information 430 may include information identifying a total amount of endorsements associated with a member, biographical information associated with endorsers, information comparing a member's endorsement information to endorsement information for other members of the social network service 130, information ranking a member's endorsements and other interactions to other member's endorsements within the social network service 130, such as cohorts of the member, and so on.

Example analytics information 440 may include any other information displaying positive feedback events associated with behaviors associated with a member of the social network service 130, such as information comparing a member to other members, information presenting results of analyses performed on data associated with a member's activities and/or positive feedback events, and so on.

As described herein, the dashboard 400 also includes an actionable element, such as a user-selectable button 425, that enables a user to perform an action based on and/or associated with information presented by the dashboard 400. Following the example shown in FIG. 4, the behavior feedback engine 160 may determine that only a small percentage of keywords associated with the member's company lead to search results that include the member's profile, and present the button 425, which, when selected by the member, enables the member to update his/her member profile information with additional details regarding his/her company or work experience.

Of course, the dashboard 400 may include other elements, information, and/or actionable elements not shown in FIG. 4.

As another example, the action module 230, as described herein, may present a recommendation to other members of the social network service that identifies one or more activities performed by the member that are associated with the positive feedback event. The action module 230 may present recommendations to members that are based on and/or tailored to the members, such as based on previous activities, or inactivities, associated with the members, and so on.

Figure 5:
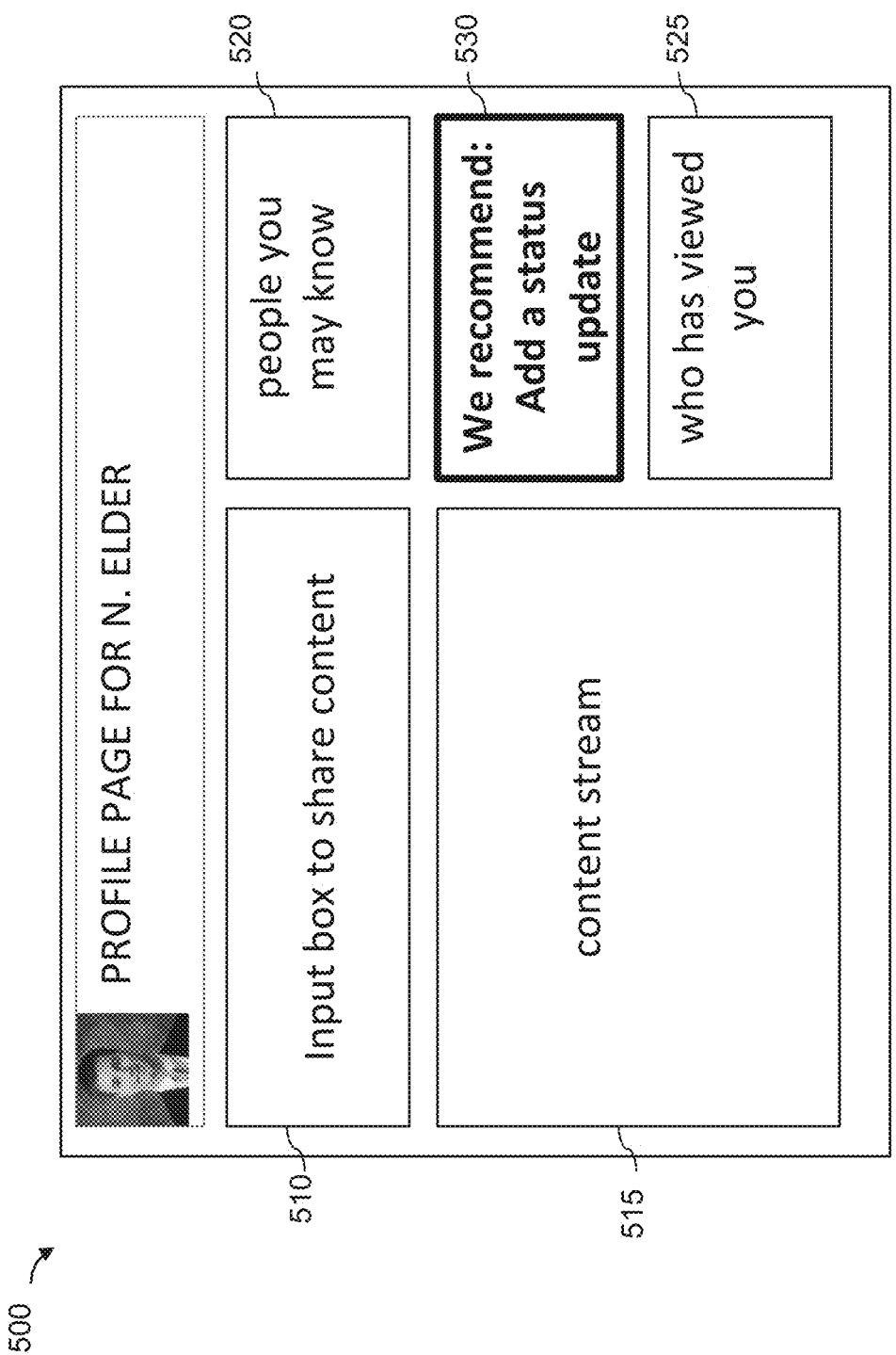
FIG. 5 is a display diagram illustrating a user interface that presents a behavior recommendation to a member of a social network, consistent with some embodiments.

FIG. 5 is a display diagram illustrating a user interface 500 that presents a behavior recommendation to a member of a social network, consistent with some embodiments. The user interface 500 depicts a member profile page, including a content input box 510, a content stream element 515, and various community or social network based information (e.g., a "people you may know" element 520, and a "who has viewed you" element 520), such as information that may also be depicted by the dashboard 400. The member profile page also includes a recommendation element 530, which may be an actionable element, such as a recommendation element to "add a status update."

For example, the behavior feedback engine 160 may determine that a high number of positive feedback events are associated with status updates published by members within the social network service 130, and also determine that the member associated with the profile page has only posted a few status updates. Based on this information, the behavior feedback engine 160 may present the recommendation element 530 to the member to add a status update, in order to generate and/or provoke positive feedback events for the member, such as other members endorsing the added status update.

Thus, in some example embodiments, the behavior feedback engine 160 may perform various actions that cause and/or facilitate members of the social network service 130 to further engage with the social network service 130 and its members, among other benefits.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 6:
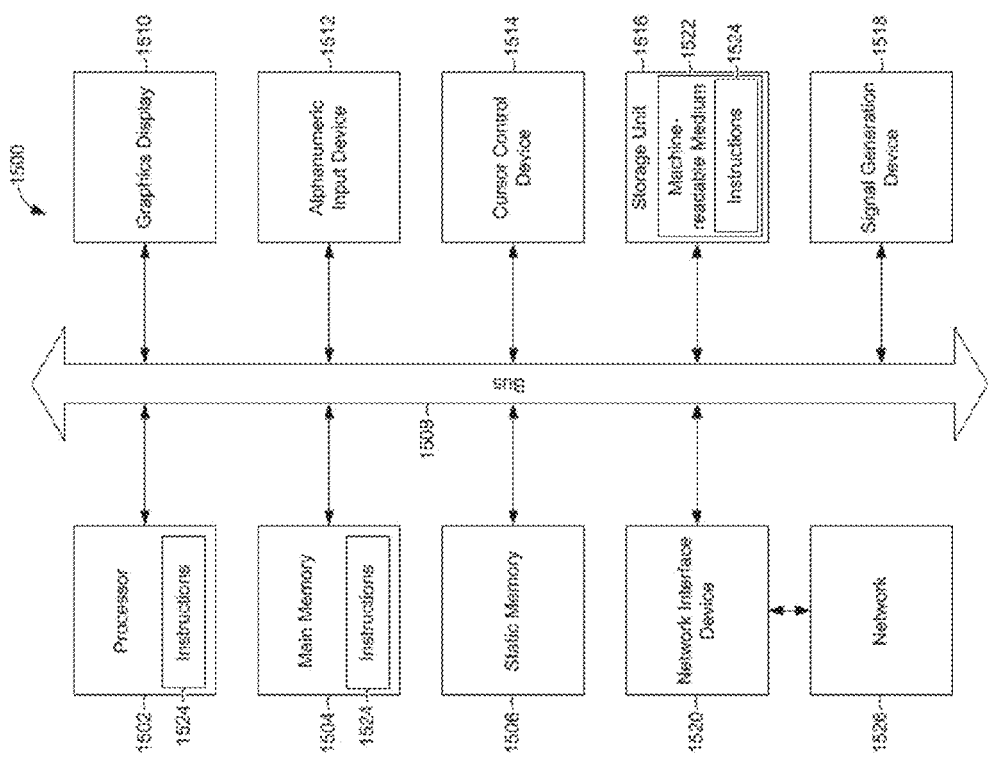
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a display unit 1510, an alphanumeric input device 1512 (e.g., a keyboard), and a user interface (UI) navigation device 1514 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors, such as a global positioning system sensor, compass, accelerometer, or other sensor.

The drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1524 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although some embodiments has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   accessing information associated with one or more positive feedback events for one or more members of a social network service, wherein a plurality of the positive feedback events comprise endorsements, by a first set of members, of content provided to the social network service by a second set of members, the content provided via a feed or content stream of the social network service, the endorsements by the first set of members resulting from the first set of members selecting a "like" button presented in association with content published in the feed or content stream of the social network service;
   identifying one or more types of the content provided by the second set of members, wherein the one or more types of the content are associated with more than a threshold number of positive feedback events performed by the first set of members of the social network service;
   subsequent to said identifying step, determining that a particular member, not included in the first and second sets of members, has provided less than a threshold number of items of the one or more types of content that are associated with more than the threshold number of positive feedback events performed by the first set of members of the social network service;
   in response to the determination, recommending to the particular member that the particular member provides more items of the one or more types of content; and
   in response to a positive feedback event associated with an item of content provided by the particular member of the social network service, updating a dashboard, for the particular member of the social network service, that contains information identifying an aggregation of positive feedback events associated with the particular member.

2. The method of claim 1, wherein accessing information associated with the one or more positive feedback events for the one or more members of the social network service includes accessing information associated with a positive feedback event that occurred within the social network service; and
   wherein the identifying the one or more types of content associated with the more than the threshold number of positive feedback events performed by the second set of members of the social network service includes identifying a type of content created by the first set of members within the social network service.

3. The method of claim 1, wherein accessing information associated with one or more positive feedback events for the one or more members of the social network service includes accessing information associated with a positive feedback event that occurred at an online location outside of the social network service; and
   wherein identifying the one or more types of content associated with the more than the threshold number of positive feedback events performed by the second set of members of the social network service includes identifying a type of content that was created by the first set of members outside of the social network service.

4. The method of claim 1, wherein accessing information associated with one or more positive feedback events for the one or more members of the social network service includes accessing information associated with endorsements of a plurality of items of content created, by the second set of members, within the social network service.

5. The method of claim 1, wherein accessing information associated with one or more positive feedback events for the one or more members of the social network service includes accessing information associated with a view of profile pages associated with the second set of members of the social network service.

6. The method of claim 1, wherein identifying one or more types of content associated with more than the threshold number of the positive feedback events that were performed by the second set of members of the social network service includes identifying content published by the second set of members to the social network service.

7. The method of claim 1, wherein identifying one or more types of content associated with more than the threshold number of the positive feedback events that were performed by the first set of members of the social network service includes identifying content published by the second set of members outside of the social network service.

8. The method of claim 1 further comprising identifying to two or more members of the social network service items of content provided by the particular member that are of the one or more types of content associated with more than the threshold number of positive feedback events.

9. The method of claim 1 further comprising, in response to a positive feedback event associated with an item of content provided by the particular member of the social network service, updating a dashboard, for the particular member of the social network service, that contains information identifying an aggregation of positive feedback events associated with the particular member.

10. The method of claim 1 further comprising updating the dashboard, for the particular member of the social network service, that contains actionable elements configured to cause the particular member to provide additional items of content of the one or more types of the content associated with the more than the threshold number of positive feedback events.

11. The method of claim 1 further comprising updating the dashboard, for the particular member of the social network service, that contains information associated with statistics for positive feedback events associated with the particular member.

12. The method of claim 1 further comprising updating the dashboard, for the particular member of the social network service, that contains information associated with two or more types positive feedback events associated with the member.

13. The method of claim 1, wherein the first set of members includes at least some members of the second set of members.

14. A system comprising:
one or more processors and a non-transitory machine readable memory storing sets of instructions that when implemented by the one or more processors:
access information associated with one or more positive feedback events for a one or more members of a social network service, wherein a plurality of the positive feedback events comprise endorsements, by a first set of members, of content provided to the social network service by a second set of members, the content including any one of: a comment relating to other content published in a feed or content stream of the social network service, a status update published via the feed or content stream of the social network service, an update to a member profile of a member of the social network service;
identify one or more types of the content provided by the second set of members, wherein the one or more types of the content are associated with more than a threshold number of positive feedback events that were performed by the first set of members of the social network service;
subsequent to the one or more types of content being identified, determine that a particular member, not included in the first and second sets of members, has provided less than a threshold number of items of the one or more types of content that are associated with more than a threshold number of positive feedback events that were performed by the first set of members of the social network service; and
in response to the determination, recommend to the particular member that the particular member provides more items of the one or more types of content; and
in response to a positive feedback event associated with an item of content provided by the particular member of the social network service, updating a dashboard, for the particular member of the social network service, that contains information identifying an aggregation of positive feedback events associated with the particular member.

15. The system of claim 14, wherein the sets of instructions, when implemented by at least one processor present a user interface that displays information identifying an aggregation of positive feedback events associated with the particular member.

16. The system of claim 14, wherein the sets of instructions, when implemented by at least one processor identify, to two or more members of the social network service, one or more items of content provided by the particular member that are of the one or more types of content associated with the more than the threshold number of positive feedback events.

17. The system of claim 14, wherein the sets of instructions, when implemented by at least one processor:
access information associated with a positive feedback event that occurred within the social network service; and
identify an activity that was performed by the particular member within the social network service.

18. The system of claim 14, wherein the sets of instructions, when implemented by at least one processor:
access information associated with a positive feedback event that occurred at an online location outside of the social network service; and
identify an activity that was performed by the particular member at the online location outside of the social network service.

19. The system of claim 14, wherein the first set of members includes at least some members of the second set of members.

* * * * *